Feb. 8, 1938.   N. C. PRICE ET AL   2,107,389
ENGINE
Filed Aug. 13, 1935   2 Sheets-Sheet 2
FIG_5_
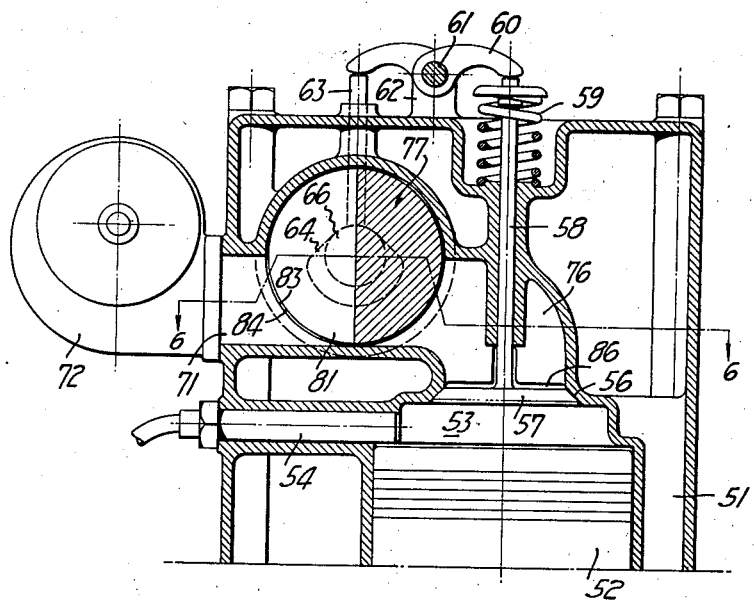
FIG_6_
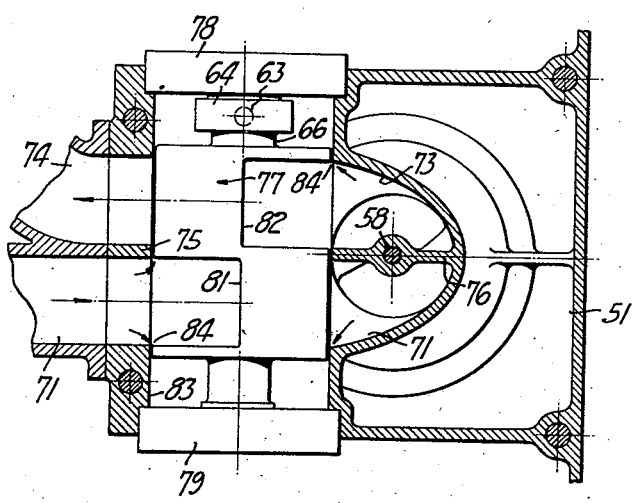
INVENTORS
Nathan C. Price
Marcus Lothrop
BY
Marcus Lothrop
ATTORNEY.

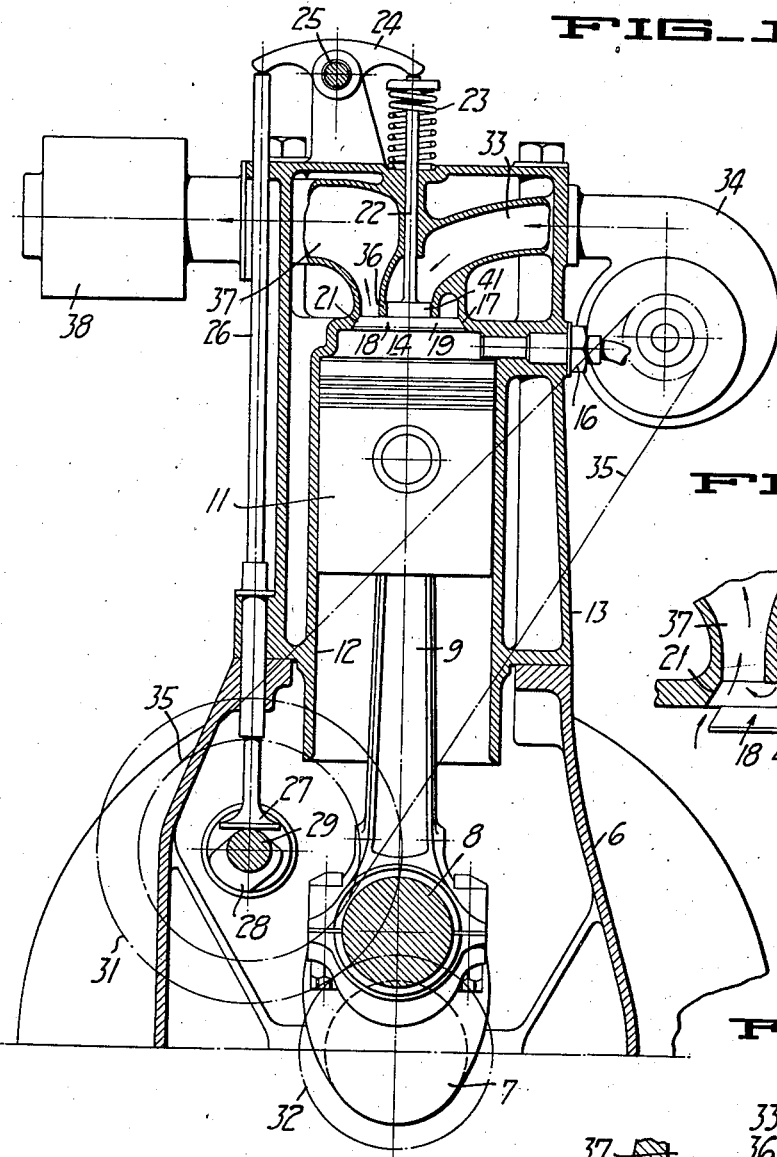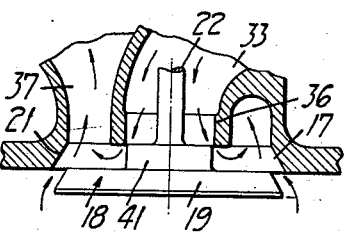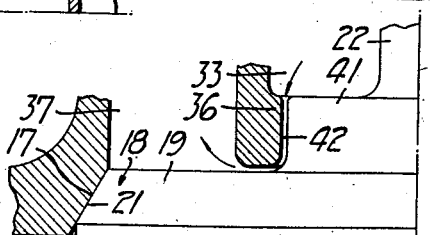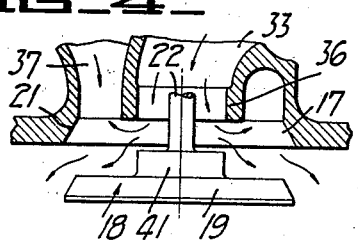
INVENTORS
Nathan C. Price
Marcus Lothrop
BY Marcus Lothrop
ATTORNEY.

Patented Feb. 8, 1938

2,107,389

UNITED STATES PATENT OFFICE 2,107,389

ENGINE

Nathan C. Price and Marcus Lothrop, Berkeley, Calif.

Application August 13, 1935, Serial No. 35,940

11 Claims. (Cl. 123—79)

Our invention relates to engines, particularly those of the air induction type in which the fuel is injected into the combustion chamber, and is concerned with such type of engines employing but a single valve, usually of the poppet type, for controlling flow into and out of the combustion chamber.

Internal combustion engines having but a single poppet valve in the combustion chamber are well known, examples being shown in Patent No. 542,846 to Diesel, dated July 16, 1895; Patent No. 1,791,991 to Widmann and Woolson, dated February 10, 1931; Patent No. 1,859,541 to Thaheld, dated May 24, 1932, and Patent No. 1,926,077 to Winslow, dated September 12, 1933. Such engines are especially adaptable for use under constant speed conditions where there is little or no necessity for induction piping or exhaust piping. They are therefore suitable for unmuffled and unsupercharged aircraft engines and for other installations wherein the speed of the engine is so nearly constant that resonant effects in the induction piping and the exhaust piping are not disadvantageous. If such a principle is to be utilized under other circumstances for marine work, for stationary engines, and for automotive and airmotive purposes, wherein supercharging is desirable and wherein exhaust muffling is a necessity, the engines are almost entirely unadaptable. But the use of a single poppet valve is very advantageous from the aspects of combustion chamber design, size of gas passages possible, temperature conditions of the valve, lightness and simplicity of construction, etc.

It is therefore an object of our invention to provide a single poppet valve engine in which the intake can be supercharged and the exhaust can be muffled.

Another object of our invention is to provide cooling and scavenging of the combustion chamber of a single-valve engine by compelling positive air flow therethrough.

Another object of our invention is to provide a single valve engine which retains most of the advantages of the single poppet valve construction and likewise obtains many of the advantages of a two-poppet valve construction.

A further object of our invention is to provide a single poppet valve engine which is mechanically quite similar to standard practice.

An additional object of our invention is in general to improve internal combustion engine design.

The foregoing and other objects of the invention are attained in the embodiment illustrated in the drawings, in which—

Fig. 1 is a diagrammatic cross-section on a vertical axial plane of one form of engine constructed in accordance with our invention.

Fig. 2 is an enlarged view of a portion of the valve in closed position and its surrounding mechanism.

Fig. 3 is a cross-section to an enlarged scale of the valve in partially open position.

Fig. 4 is a cross-section similar to Figs. 2 and 3 but showing the valve in fully open position.

Fig. 5 is a cross-section similar to Fig. 1 but showing a modified form of engine in accordance with our invention.

Fig. 6 is a cross-section the plane of which is indicated by the line 6—6 of Fig. 5.

In its preferred form, the engine of our invention includes a combustion chamber having a single poppet valve therein which controls communication between the chamber and an intake duct and an exhaust duct which are entirely separate but join at the valve aperture, together with means operating in time with the engine for blocking, partially but not entirely, at least one of the ducts in order to guide the gas flow approximately but operating with sufficient mechanical clearance so that no lubrication is required for the movable blocking means and so that flow can occur continuously between the ducts around the blocking means.

In the form of our invention especially disclosed in Figs. 1 to 4, inclusive, there is provided the customary crank case 6 within which a crank shaft 7 is journaled, the crank shaft having a crank pin 8 connected by a rod 9 to a piston 11. The piston operates in a cylinder 12 formed in a cylinder block 13 suitably secured to the crank case 6. The upper end of the cylinder 12 forms a combustion chamber 14 into which an injection device 16 discharges fuel in accordance with any of the customary systems (not shown). The chamber 14 has an aperture 17 therein which is closed by a single valve 18 of the poppet type located coaxially or concentrically with the cylindrical combustion chamber. The valve has a valve head 19 resting against a conical seat 21, and a stem 22 which extends upwardly through the cylinder block 13 where it is engaged by a closure spring 23. The valve is actuated by a rocker arm 24 journaled on a pin 25 supported on the block 13 and oscillated by a push rod 26 extending to a tappet 27 in contact with a cam 28 on a cam shaft 29. The cam shaft is driven from the crankshaft 7 by a large gear 31, twice the diameter of the crankshaft driving gear 32, all in accordance with customary practice. With the mechanism as so far described, reciprocation of the piston 11 causes rotation of the crank pin 8 and of the crankshaft 7, so that the gear 32 drives the gear 31 and, through the cam 28, the push rod 26 and the rocker 23, operates the valve 18 in time with the operation of the engine.

Since the engine is of the injection type, we preferably provide means, in accordance with our invention, for admitting atmospheric air to the combustion chamber 14. To this end, within the block 13 is an intake duct 33, at one end connected to a pressure blower 34 of any preferable type which is operated by a driving connection 35 to the cam shaft 29, for example, in accordance with the speed of the engine. The other end of the duct 33 is directed into a position in which it is substantially concentric with the valve stem 22 and constitutes a ring 36 almost in contact with the valve head 19. In order to discharge gases from the combustion chamber 14, we provide in the block 13 an exhaust duct 37 which in effect merges with the valve seat 21 and extends from a location concentric with the valve stem 22 out through the block 13 to an appropriate muffling device 38.

In accordance with our invention, we provide means for blocking at least one of the ducts 33 and 37 periodically in synchronism with or in cyclic relationship to the operation of the engine. We preferably provide a means which will require absolutely no lubrication and which at the same time will permit a minor current of air to pass continuously, or virtually so, from the intake duct 33 into the exhaust duct 37. To this end, the valve 18 is formed with a block 41 concentric with the stem 22 and merging with the head 19. This block is in contour a circular disc which fits the outlet 36 of the duct 33 quite loosely. As shown especially in Fig. 2, there is an appreciable passageway 42 or clearance between the block 41 and the duct 33, so that even when the valve is seated there is flow through the passage way 42 between the ducts 33 and 37. The clearance between the parts 41 and 33 is sufficient so that there is no possibility of sliding or rubbing contact between the two which would entail the necessity of lubrication. On the other hand, the size of the passage 42 is maintained at a minimum to produce these desired results; and the total area of cross-section of the passage 42 is made as small as is conveniently possible.

In the operation of an engine as herein described, with the piston 11 approximately on top dead center at the beginning of the power stroke (assuming that the injector 16 is operating or has just operated), the valve 18 is in closed position, and expansion of the burning gases drives the piston downwardly. Approximately at the bottom of the stroke of the piston, the cam 28 has rotated, counterclockwise as seen in Fig. 1, into such a position that the valve 18 is opened for approximately half of its possible travel into a position as shown in Fig. 3. In this position of the valve, the block 41 still is in proximity to the terminus 36 of the intake duct 33 and precludes more or less effectively the passage of gas thereinto from the combustion chamber 14, particularly during the initial, high-pressure exhaust discharge. At the same time the valve 18 has departed far enough from its seat 21 so that free access is had to the exhaust duct 37. During the succeeding inward or upward movement of the piston 11, therefore, exhaust gas flows outwardly through the duct 37 and the muffler 38 to discharge.

When the piston arrives adjacent top dead center at the end of the exhaust stroke, the cam 28 has revolved to such a position that the valve 18 is opened for the remainder of its possible travel. This is the position shown in Fig. 4, in which the block 41 has been moved a material distance away from the inlet duct 33. Since by this time the exhaust pressure has dropped substantially to that of the atmosphere, and since the blower 34 produces a pressure in the intake duct 33 somewhat above that of the atmosphere, or approximately so, there is a flow of atmospheric air through the duct 33, around and in immediate contact with the end 36 of the duct, the upper surface of the valve head 19, and into the combustion chamber 14. The concentric arrangement of the intake duct, the valve and the combustion chamber enhances the production of a symmetrical flow of air and facilitates the creation of a vortical or coaxial swirl to increase turbulence. During the intake stroke the operation of the blower 34 is assisted by the downward, inductive movement of the piston 11. When the piston has reached approximate bottom center and has completed the induction stroke, the position of the cam 28 is then such that the valve 18 is returned throughout its entire movement and is again seated, as shown in Figs. 1 and 2, during the following compression stroke wherein the piston 11 returns to its upper dead center position and injection takes place. This cycle repeats itself indefinitely during the operation of the engine.

It is pointed out that by an appropriate design of the fluid passages, especially the muffling device 38 and the exhaust duct 37, it is possible to utilize resonant conditions to produce a backward pressure wave in the exhaust which will effectively assist in charging the combustion chamber. Additionally, while the engine will operate satisfactorily without the blower 34 it is considerably more effective when the pressure, due to the blower, is sufficient to maintain a continuous current of fresh air through the leakage space 42 in order to maintain the valve 18 relatively cool and in order to maintain a substantially constant direction of flow of gases in the ducts 33 and 37 so that there will be no tendency toward indiscriminate reversal thereof during the operation of the engine. Such flow of air is valuable during the approximately three-quarters of the cycle wherein exhaust is not occurring, to assist in propelling the previously exhausted gases through the eduction system to discharge.

The air blown through the system in this fashion and which does not undergo the working process in the combustion chamber, in one aspect is entirely wasted, so should therefore be maintained at a minimum value; but from another aspect it is useful in increasing the scavenging of the engine to such an extent that considerably better results are obtained with this arrangement than can be obtained in standard practice with a single-valve, poppet valve engine. This is particularly true when the clearance space 42 is enlarged in time with the operation of the engine by the further opening of the valve, as shown in Fig. 4, prior to the end of the exhaust stroke to permit a flushing flow of intake air to scavenge the combustion chamber. The scrubbing action occurring not only drives out burned gases but cools the cylinder and combustion chamber walls by direct absorption of heat therefrom, thus improving the volumetric efficiency. Since the terminus 36 of the intake duct is virtually at the boundary of the combustion chamber, the scavenging air cannot by-pass the chamber but must flow thereinto before it can enter the exhaust duct. The valve 18 itself is very similar to a standard poppet valve design, the cam shaft 28 differs from standard practice only enough to produce the two-step valve opening described and to close the exhaust after the intake is closed, and the arrangement of the ducts 33 and 37 is only slightly different than usual. In the main, standard practice is followed. Furthermore, no difficulty is experienced with lubrication, since the clearance passage 42 is of large enough size that lubrication of the blocking means can be dispensed with.

When the described arrangement is utilized in a carbureting engine, we prefer to provide means for ensuring that the fluid passed from the duct 33 into the duct 37 is simply air and contains no fuel.

Under certain conditions of operation it may be preferable to provide a blocking arrangement for the exhaust duct as well as for the intake duct, and additionally it may be desirable to change the shape of the cam for operating the valve in such a way that the motion of the valve more nearly approximates a harmonic motion, to enable high speeds of operation to be attained. Under these conditions we provide the arrangement shown in Figs. 5 and 6. This arrangement is somewhat similar to devices disclosed in the patent literature (for instance, Abell Patent No. 1,311,200 granted July 29, 1919, and Keister Patent No. 1,951,759 granted March 20, 1934) but is particularly characterized by means for maintaining a substantially continuous current of air flowing through the induction and eduction mechanisms of the engine during the entire operation thereof.

The engine is similar to that shown in Fig. 1 and includes a cylinder block 51 within which a piston 52 reciprocates. A combustion chamber 53 is formed in the block 51, and an injection device 54 discharges into the combustion chamber 53. An aperture 56 in the combustion chamber provides a seat for a poppet valve 57 which has a stem 58 extending substantially concentrically with the cylinder axis. A spring 59 tends to maintain the valve 57 in closed position. An actuating rocker 60 is journaled as at 61 on a bracket 62 extending from the block 51. The rocker is operated by a push rod 63 bearing on a cam 64 on a cam shaft 66 which is driven by the engine in the customary fashion and operates at one-half crankshaft speed.

In accordance with our invention we provide an intake duct 71 which extends from the outside of the block 51 into the valve aperture 56. The duct 71 at its intake end is preferably supplied by an air blower 72, although this can be dispensed with under certain circumstances. The blower is preferably driven by the engine in direct proportion to the speed thereof. To conduct burned gases away from the chamber 53 we provide an exhaust duct 73 which extends from the aperture 56 to a suitable point of discharge 74 and is almost entirely separate from the intake duct 71 (which may be helical to twist the incoming air), being separated therefrom by a partition wall 76 and an extension 75.

In order to serve as a blocking means for the intake duct 71 and the exhaust duct 74, we provide a rotary barrier 77 contained in the cylinder block 51 and rotatably mounted in journals 78 and 79. This barrier includes a body having an induction passageway 81 and an exhaust passageway 82 formed therein. These are in transverse cross-section bounded approximately by the periphery of the body and a diameter thereof, but are arranged 180° out of phase. Especially in accordance with our invention, the barrier 77 does not fit tightly within its bore 83 in the block, but preferably passageways 84 for leakage exist therebetween. The bearings 78 and 79 alone support the barrier, and the dimensions of the passageways 84 are such that the barrier does not at any time contact with its surrounding bore. There is consequently no necessity for lubricating the rotary barrier with liquid, but gas leakage exists therearound at all times.

Additionally, in accordance with our invention we provide passageways 86 between the valve 57 in closed position and the terminus of the partition wall 76, so that leakage takes place at this location as well. Since the surfaces of the valve and its stem and of the partition wall 76 are never in contact there is no necessity for lubrication therebetween. During the operation of the engine, therefore, and especially due to the operation of the blower 72, there is always, or substantially always, a current of fresh air flowing into the intake duct 71 through all of the leakage passages 84 and 86, so that there is a continuous, or substantially continuous, flow from the intake duct 71 across to the exhaust duct 73. By this means the various parts are operated without contact, and a current of air is maintained in an appropriate direction to assist in induction of air and eduction of exhaust gases, to assist in cooling the parts, and to permit the use of this type of mechanism without lubrication.

In the operation of the engine shown in Figs. 5 and 6, when the piston starts downwardly from its upper dead center position on the power stroke, the valve 57 is closed and the injector 54 is operating or has just ceased operating. At bottom dead center position at the conclusion of the power stroke the poppet valve 57 is opened fully by suitable rotation of the cam 64 and operation of the rocker 60, and at this time the passageway 82 is in such a rotated position that a fully open path is provided from the chamber 53 past the opened valve 57 into the duct 73 and through the passage 82 into the pipe 74 to discharge. Some gas may tend to travel into the intake duct 71 but is prevented from passing materially thereinto because the passageway 81 is not in registry therewith and a virtually continuous barrier is presented to such gas. Some leakage may take place, but this is of minor amount and consequence.

As the piston 52 arrives substantially at top dead center at the conclusion of the exhaust stroke, the valve 57 remains open, but by that time the rotary barrier 77 has revolved to such an extent that the passageway 82 is out of registry with the passageway 73, but the passageway 81 begins to register with the intake duct 71. Fresh air is thereupon blown through the passageway 81 and the duct 71 and over the valve 57 into the combustion chamber 53. Some of this air leaks around the valve into the duct 73 and around the barrier 77 into the exhaust pipe 74. This is minor in amount, however, and of no material consequence. At the conclusion of the induction operation at bottom dead center position of the piston 52, the valve 57 is seated due to the continued rotation of the cam 84, and the piston 52 rises in effecting compression of the trapped air. Adjacent top dead center position the injector 54 operates and the cycle, having been concluded, repeats itself indefinitely during the operation of the engine.

In this case likewise the effect of resonance under certain conditions can be taken account of, and the precise relationship of the passages 81 and 82 with the timing of the valve 57 can be varied to produce the best results. With this arrangement, however, in common with the arrangement shown in Figs. 1 to 4, inclusive, there is maintained a continuous, or substantially continuous, current of air flowing from the intake duct into the exhaust duct in immediate proximity with the valve during the entire operation of the engine, and sufficient clearance is provided between such ducts and all moving parts operating in conjunction therewith that lubrication is not only not required but can be entirely dispensed with. The amount of air which is utilized as leakage air from the intake duct through the exhaust duct while in one aspect is wasted, in another aspect is very valuable in assisting scavenging, promoting clearance of exhaust products from the engine, and cooling and facilitating operation of the parts.

We claim:

1. An engine comprising a combustion chamber, an intake duct leading to said combustion chamber, a separate exhaust duct leading from said combustion chamber, a valve for controlling flow between both of said separate ducts and said combustion chamber, and means effective during the operation of said engine for maintaining a current of air flowing from said intake duct over the surface of said valve and into said exhaust duct.

2. An engine comprising a combustion chamber, an intake duct leading toward said combustion chamber, an exhaust duct leading away from said combustion chamber, a poppet valve movable between a closed position in which said combustion chamber is sealed from said intake duct and said exhaust duct and an open position in which said combustion chamber is open to said intake duct and said exhaust duct, and means operating in time with said poppet valve for blocking but not entirely preventing communication between said intake duct and said exhaust duct.

3. An engine comprising a combustion chamber, an intake duct leading toward said combustion chamber, an exhaust duct leading away from said combustion chamber and communicating with said intake duct, and means for partially blocking but not entirely preventing gas flow between said intake duct and said exhaust duct.

4. An engine comprising a combustion chamber, an intake duct leading toward said combustion chamber, an exhaust duct leading away from said combustion chamber, a poppet valve for controlling flow between both of said ducts and said combustion chamber, and means movable in said ducts for blocking but not entirely preventing communication therebetween, said means moving with sufficient clearance to require no lubrication.

5. An air induction engine comprising a combustion chamber, an air-intake duct, an exhaust duct, means cyclically effective to establish a predetermined flow of air through said intake duct to said combustion chamber, means cyclically effective to establish a flow of exhaust gas from said combustion chamber through said exhaust duct only, and means continuously effective to establish a smaller flow of air through said intake duct into said exhaust duct.

6. An air induction engine comprising a combustion chamber, an air-intake duct, a separate exhaust duct, means for controlling communication between said combustion chamber and said intake and exhaust ducts, and means providing a leakage passage between said intake duct and said exhaust duct.

7. An air induction engine comprising a combustion chamber, a poppet valve in said chamber, an intake duct leading to said valve, and an exhaust duct leading away from said valve, said ducts being entirely non-communicating when said valve is substantially closed except for open leakage passages therebetween.

8. An air induction engine comprising a combustion chamber, an air intake duct leading to said combustion chamber, an exhaust duct leading away from said combustion chamber, a valve for controlling communication between said chamber and said ducts, and means movable in time with the operation of said engine for blocking at least one of said ducts, said movable blocking means having a sufficiently free mechanical fit as to require no lubrication and to permit leakage thereby between said ducts.

9. An engine comprising a combustion chamber, an intake duct, an exhaust duct, said ducts opening through a common aperture into said combustion chamber, a poppet valve for closing said aperture, and means on said valve for blocking said intake duct except for a leakage passage.

10. An engine comprising a combustion chamber, a poppet valve in said combustion chamber, an intake duct leading to said valve, an exhaust duct leading away from said valve, and means operating in time with said engine for alternately blocking each of said ducts partially.

11. An engine comprising a combustion chamber, an intake duct, an exhaust duct, said ducts being separate but opening through a common aperture into said combustion chamber, a valve for closing said aperture, portions of said valve being separated from their surroundings by a clearance space, and means for enlarging said space in time with the operation of said engine.

NATHAN C. PRICE.
MARCUS LOTHROP.